UNITED STATES PATENT OFFICE.

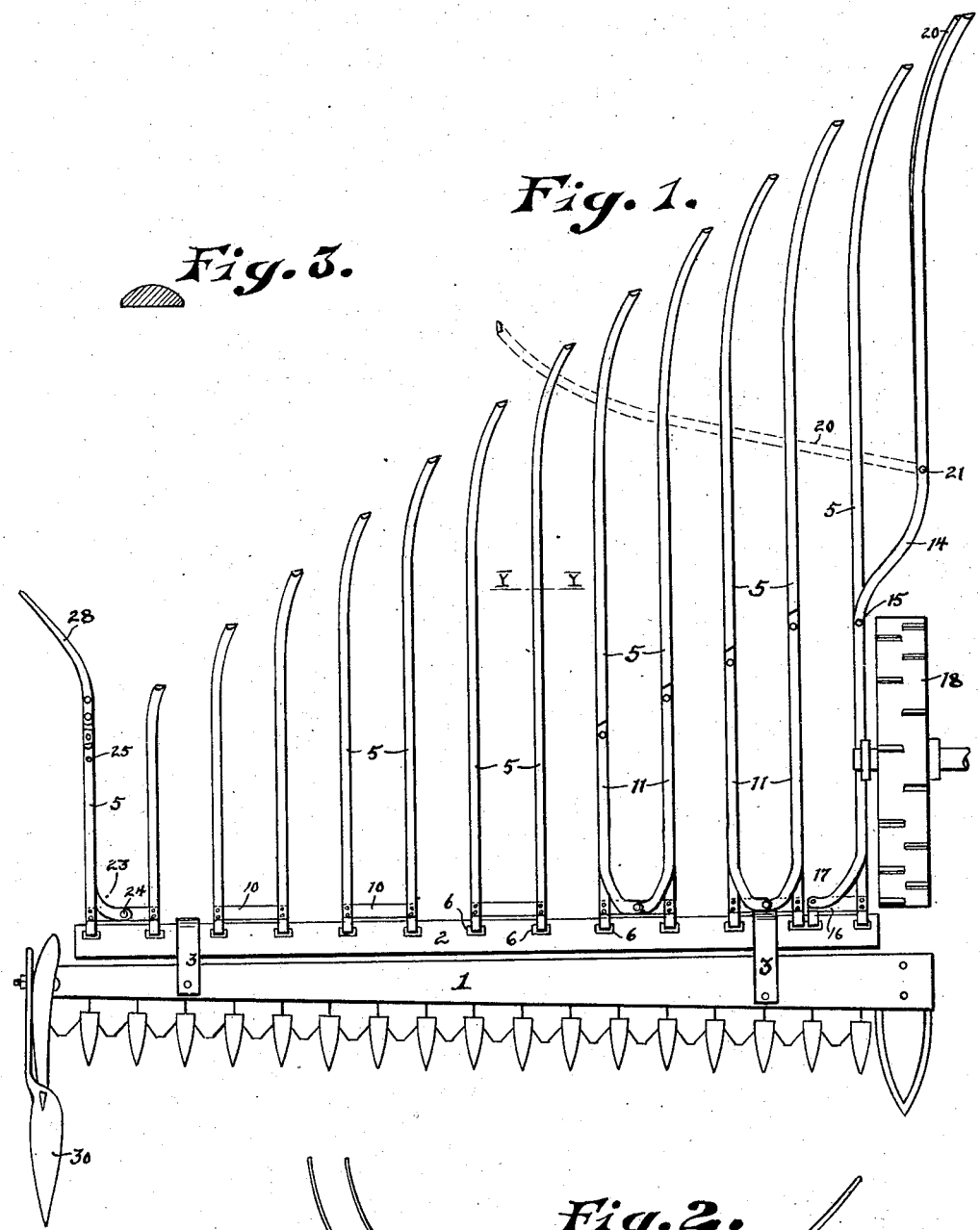

WILLIAM GATERMAN, OF MANITOWOC, WISCONSIN.

WINDROWING ATTACHMENT.

No. 891,244. Specification of Letters Patent. Patented June 23, 1908.

Application filed January 5, 1906, Serial No. 294,713. Renewed November 23, 1907. Serial No. 403,539.

*To all whom it may concern:*

Be it known that I, WILLIAM GATERMAN, a citizen of the United States, residing at Manitowoc, county of Manitowoc, and State of Wisconsin, have invented new and useful Improvements in Windrowing Attachments, of which the following is a specification.

My invention relates to improvements in windrowing attachments for mowing and reaping machines.

The object of my invention is to provide an improved form of attachment in which the windrowing bars are secured to the connecting bars in pairs and arranged for mutual support, with a slight lateral mobility in each pair of bars; also to provide a swinging bar adapted to prevent a delivery of the collected hay or grain when turning corners; also to secure a maximum degree of strength with minimum weight and the greatest freedom of delivery.

In the following description reference is had to the accompanying drawings in which,—

Figure 1 is a plan view of a sickle bar with my invention applied thereto. Fig. 2 is a detail side view of the outer end portion of the sickle bar and its attachment. Fig. 3 is a cross sectional view of one of the windrowing bars.

Like parts are identified by the same reference characters throughout the several views.

1 is the sickle bar of a mowing or reaping machine, and 2 is a connecting bar attached to the sickle bar by links 3. The windrowing bars 5 are formed of half oval wire and are looped through slots 6 in the connecting bar 2, forming a hinged joint connection. The under surface of the bars 5 is flat, while the upper surface is rounded, as best illustrated in Fig. 3. The bars 5 are of progressingly increasing length from the outer to the inner end of the sickle bar, and their rear ends are curved upwardly as shown. The bars 5 are also rigidly connected in pairs near their front ends by cross bars 10, and the longer bars 5 are additionally reinforced by stays 11, the rear ends of which are secured to the bars 5, while the front ends are curved inwardly and are centrally secured to the cross bars 10. The innermost and longest bar 5 is reinforced by a bar 14 secured to said bar 5 at 15 and to a cross bar 16 at 17. The outer end portion of the bar 14 is off-set to the rear of the wheel 18, and extended in a position substantially parallel to the bars 5, whereby it is adapted to serve as a continuation of the windrowing series. A branch bar 20 is pivotally secured to the outer end portion of the bar 14 at 21, and is adapted to swing inwardly to the position in which it is shown in Fig. 1 when turning corners. In this position it lifts several of the inner bars 5 and prevents the delivery of material from these bars, such delivery being ordinarily effected by the friction of the material upon the surface of the ground between the windrowing bars. It also prevents bars 5 from catching and being twisted or broken. When the machine is moved in a straight line the branch bar 20 swings backwardly and trails with the bar 14.

The outermost bar 5 is braced by a stay bar 23, which is connected with the cross bar at 24, and with the windrowing bar at 25. The brace bar 26 supports the upwardly curved portion of the outer bar 5 from the stay bar 23, the object of this construction being to reinforce this end windrowing bar to enable it to withstand the pressure of uncut grain or hay, which by lodging might extend into the path of this bar. The bar 23 also serves as a shoe and is provided with a trailing arm 28, which is curved outwardly to push back lodged grain or grass out of the path of the wheels when making the next round. This arm 28 acts supplementally to the removable guard 30 and the shoe 31 on the outer end of sickle bar 1.

By connecting the windrowing bars in pairs and loosely securing these pairs of bars to the connecting bar 2, a certain mobility in the windrowing bars is permitted, while the spaces between the bars are kept substantially equal. The strain upon the connections is thus greatly reduced and the structure rendered much more durable than with the windrowing bars independently connected by bolts or rivets.

Having thus described my invention what I claim as new, and desire to secure by Letters Patent is,—

1. In a device of the described class, the combination with a sickle bar; of a series of trailing windrowing bars, each having hinged connection with the sickle-bar and each having rigid connection with another of the windrowing bars near its forward end.

2. In a device of the described class, the combination with a sickle bar; of a series of trailing windrowing bars, each having hinged connection with the sickle bar and each having rigid connection with another of the windrowing bars near its forward end, together with stays centrally connected to a suitable support between some of the windrowing bars, and secured to the bars intermediate of their ends.

3. In a device of the described class, the combination with a sickle bar, of a connecting bar linked thereto, and provided with a series of slots; windrowing bars having their front ends looped through said slots, and forming a hinge connection with the connecting bar; and cross-bars rigidly connecting the windrowing bars in pairs adjacent to their front ends.

4. In a device of the described class, the combination with a sickle bar; of a set of trailing windrowing bars having upwardly curved rear ends and progressively increasing in length from the outer to the inner bars of the set; each of said bars being formed of half oval wire with the rounded surface uppermost.

5. In a device of the described class, the combination with a set of windrowing bars, of a supplemental off-set inner bar; and a trailing bar pivotally connected therewith and adapted to swing underneath some of the windrowing bars when turning corners.

6. In a device of the described class, the combination with a sickle bar having a trailing shoe at its outer end; of a set of windrowing bars connected with the sickle bar; an outer windrowing bar mounted upon the trailing shoe and having an upwardly curved end portion; and a brace connecting said upwardly curved portion with the shoe.

7. In a device of the described class, the combination with a sickle bar provided with a trailing shoe at its outer end, of a set of windrowing bars connected with the sickle bar; an outer windrowing bar having an upwardly curved end portion; a brace connecting the upwardly curved portion with the shoe; and an outwardly and rearwardly projecting guard arm secured to the rear end of said shoe.

In testimony whereof I affix my signature in the presence of two witnesses.

WILLIAM GATERMAN.

Witnesses:
   LEVERETT C. WHEELER,
   JAS. B. ERWIN.